United States Patent [19]

Cyron

[11] Patent Number: 4,777,158

[45] Date of Patent: Oct. 11, 1988

[54] METHOD FOR THE SELECTIVE BRAZING OF A METALLIC CATALYST CARRIER BODY AND A CORRESPONDINGLY PRODUCED CATALYST CARRIER BODY

[75] Inventor: Theodor Cyron, Bergisch-Gladbach, Fed. Rep. of Germany

[73] Assignee: Interatom GmbH, Bergisch-Gladbach, Fed. Rep. of Germany

[21] Appl. No.: 897,753

[22] Filed: Aug. 18, 1986

[30] Foreign Application Priority Data

Aug. 19, 1985 [DE] Fed. Rep. of Germany ....... 3529654

[51] Int. Cl.$^4$ .......................... B01J 32/00; B01J 35/04
[52] U.S. Cl. ...................................... 502/439; 502/527
[58] Field of Search ................................ 502/439, 527

[56] References Cited

U.S. PATENT DOCUMENTS 3,208,131 9/1965 Ruff et al. ..................... 502/527 X
4,300,956 11/1981 Rosenberger et al. ......... 502/527 X

FOREIGN PATENT DOCUMENTS 0121174 10/1984 European Pat. Off. .
2727967 10/1983 Fed. Rep. of Germany .
3312944 10/1984 Fed. Rep. of Germany .
2069364 8/1981 United Kingdom .

*Primary Examiner*—W. J. Shine
*Attorney, Agent, or Firm*—Herbert L. Lerner; Laurence A. Greenberg

[57] ABSTRACT

A method for selectively applying brazing to a catalyst carrier body includes alternately winding smooth and wavy layers of sheet metal into a catalyst carrier body having outer surfaces, dividing at least one of the outer surfaces into regions to be brazed covering a portion of the at least one outer surface as seen in circumferential and radial directions, and applying brazing to the regions and a catalyst carrier assembly for carrying out the method.

26 Claims, 2 Drawing Sheets

METHOD FOR THE SELECTIVE BRAZING OF A METALLIC CATALYST CARRIER BODY AND A CORRESPONDINGLY PRODUCED CATALYST CARRIER BODY

The invention relates to a method for applying brazing material to a catalyst carrier body wound from alternating smooth and wavy layers of sheet metal, and a correspondingly produced catalyst carrier body.

European Patent Application No. 0 121 174 discloses a catalyst carrier body formed of alternating smooth and wavy sheet metal layers and discusses problems which are caused by changing thermal loads. In the spirally wound catalyst carrier bodies according to that publication, all of the tangential points between the smooth and wavy layers are brazed together, so that the capability of absorbing expansions must be provided by other means, such as expansion slits.

German Published, Non-Prosecuted Application DE-OS No. 33 12 944 discloses a tension-relieved metal carrier housing, which only illustrates connections between the smooth and wavy sheet metal layers at certain places, which are chosen according to a predetermined system. However, in that method the brazing material must be applied before the winding operation, which makes the method relatively costly from a manufacturing point of view.

It is accordingly an object of the invention to provide a method for the selective brazing of a metallic catalyst carrier body and a correspondingly produced catalyst carrier body, which overcomes the hereinafore-mentioned disadvantages of the heretofore-known methods and devices of this general type, which produces catalyst carrier bodies that are resistant to varying thermal loads, while minimizing the number of operational steps required and which minimizes the material required for the process.

With the foregoing and other objects in view there is provided, in accordance with the invention, a method for selectively applying brazing material to a catalyst carrier body, which comprises alternately winding smooth and wavy layers of sheet metal into a catalyst carrier body having outer or front surfaces, dividing at least one of the outer surfaces into regions to be brazed covering a portion of the at least one outer surface as seen in circumferential and radial directions, and applying brazing material to the regions.

In accordance with another mode of the invention there is provided a method, which comprises dividing the at least one outer surface into continuous regions in the dividing step.

In principle, the application of brazing material to the front or outer surfaces of previously wound catalyst carrier bodies is known in the art, but a selective application of the brazing material to only defined regions of the front or outer surfaces has not been proposed heretofore. Experience has shown that a completely brazed front or outer surface is relatively stiff and during changing thermal loads results in the destruction of the catalyst carrier body. According to the invention, it is therefore proposed to apply brazing material only to certain regions of one or both front or outer surfaces, so that a much more flexible carrier matrix is produced.

Thus, the expansion slits which are necessary in completely brazed front or outer surfaces, are replaced by the regions without brazing material. In these regions, the wavy sheet metal layers can absorb the thermal expansions by deformation. Care must therefore be taken to ensure that each soldered region only bonds a part of the front or outer surface, in the circumferential direction as well as in the radial direction. Neither a whole radius nor a whole circumference of a layer should be completely brazed.

In accordance with an added mode of the invention there is provided a method, which comprises dividing the catalyst carrier body into cells with given dimensions including a greatest dimension, contacting each of the layers with at least one and preferably three or more brazed regions, and setting dimensions of the regions to be brazed during the dividing step including a smallest dimension being greater than the greatest dimension of the cells.

In accordance with the additional mode of the invention there is provided a method, which comprises forming a regular pattern with the regions to be brazed during the dividing step.

In accordance with a further mode of the invention there is provided a method, which comprises forming the regions to be brazed in the form of spiral arms which may be interconnected in the middle of the at least one outer surface, during the dividing step.

In accordance with again another mode of the invention there is provided a method, which comprises widening the spiral arms toward the periphery of the at least one outer surface during the dividing step.

In accordance with again another mode of the invention there is provided a method, which comprises widening the spiral arms toward the periphery of the at least one outer surface during the dividing step.

In accordance with again an added mode of the invention there is provided a method, which comprises forming an irregular pattern with the regions to be brazed during the brazing step. According to the invention, in order to ensure the stability of the catalyst carrier body, it is important to provide sufficient brazed regions, although it is not important whether these regions form a regular or irregular pattern, as long as they leave enough regions for expansion according to the object of the invention.

In accordance with again an additional mode of the invention there is provided a method, which comprises placing a material from the group consisting of adhesive, contact adhesive and bonding or binding material on the regions to be brazed and subsequently applying the brazing material on the material.

In accordance with again a further mode of the invention there is provided a method, which comprises applying the material with a prefabricated elastic stamp corresponding to the regions.

In accordance with still another mode of the invention there is provided a method, which comprises applying the brazing material and/or material through a suitably prefabricated mask corresponding to the regions. The choice of the method through which the brazing material is applied, can also determine to what degree brazing material reaches the interior of the catalyst carrier body from the front or outer surfaces, depending on the requirements for the connection.

In accordance with still an added mode of the invention there is provided a method, which comprises forming the regions to be brazed wider as seen in the radial direction than as seen in the circumferential direction of the at least one outer surface, during the dividing step.

In accordance with still an additional mode of the invention there is provided a method, which comprises offsetting the regions to be brazed relatively to each other in at least one of the circumferential and/or radial directions of the at least one outer surface, during the dividing step.

In accordance with still a further mode of the invention there is provided a method, which comprises covering less than half and preferably 10 to 30% of the at least one outer surface with the regions to be brazed, during the dividing step.

With the objects of the invention in view there is also provided a catalyst carrier assembly, comprising a catalyst carrier body formed of alternately wound smooth and wavy layers of sheet metal, the catalyst carrier body having outer or front surfaces, regions to be brazed covering a portion of at least one of the outer surfaces as seen in circumferential and radial directions, and brazing material disposed on the regions.

In accordance with another feature of the invention, the regions are continuous.

In accordance with a further feature of the invention, the catalyst carrier body is divided into cells with given dimensions including a greatest dimension, each of the layers is contacted by at least one and preferably three or more of the brazed regions, and the regions to be brazed have dimensions including a smallest dimension being greater than the greatest dimension of the cells.

In accordance with again another feature of the invention, the regions to be brazed form a regular or irregular pattern.

In accordance with again an additional feature of the invention, the regions to be brazed are in the form of spiral arms which may be interconnected in the middle of at least one outer surface and may be wider at the periphery of the at least one outer surface.

In accordance with again a further feature of the invention there is provided a material from the group consisting of adhesive, contact adhesive and bonding or binding material disposed on the regions to be brazed, below the brazing material.

In accordance with still another feature of the invention the regions to be brazed are wider as seen in the radial direction than as seen in the circumferential direction of the at least one outer surface.

In accordance with still an additional feature of the invention, the regions to be brazed are mutually offset in at least one of the circumferential and radial directions of the at least one outer surface.

In accordance with a concomitant feature of the invention, the regions to be brazed cover less than half and preferably 10 to 30% of the at least one outer surface.

Other features which are considered as characteristic for the invention are set forth in the appended claims.

Although the invention is illustrated and described herein as embodied in a method for the selective brazing of a metallic catalyst carrier body and a correspondingly produced catalyst carrier body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
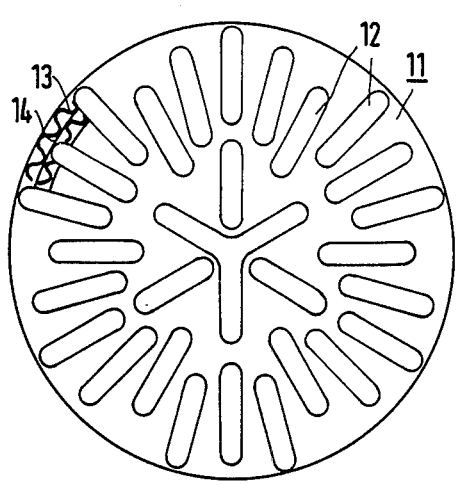
FIGS. 1 to 5 are diagrammatic, front-elevational views of catalsyt carrier bodies according to different embodiments of the invention, indicating the regions which are brazed.

Referring now to the figures of the drawings in detail and first, particularly, to FIG. 1 thereof, there is seen a configuration of brazed regions 12 on a catalyst carrier body 11 which repeats after every 120° rotation around a center point, wherein a construction of smooth wound sheet metal bands 14 and wavy wound sheet metal bands 13 is indicated partially and diagrammatically. However, each region 12 covers several layers or waves of the wound sheet metal bands, 13, 14 and each layer is covered by at least one region. The exact size of the regions 12 which are brazed is variable within wide limits, but it is preferable that the regions 12 are off-set with respect to each other in the radial and/or circumferential directions, in order to achieve an optimal distribution of the brazed regions 12, and interposed regions. The smallest dimension of a region should be greater than the largest dimension of a cell of the catalyst carrier body. The selective brazing of outer or front surfaces also results in a savings of brazing material, since considerable portions of the areas, such as 70 to 90%, are not brazed. The brazing and complete brazing material coating of one outer or front surface can be performed in one operation, or adhesive, contact adhesive or bonding or binding material can be applied before the brazing material, such as with a stamp prefabricated to the correct shape. The brazing material or adhesive or bonding material can also be applied through a mask.

Figure 2:
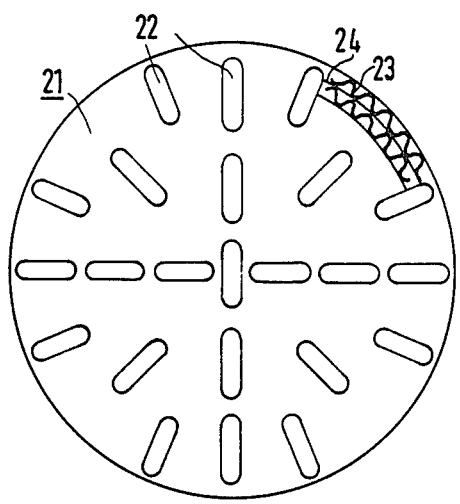

FIG. 2 shows the front surface of a catalyst carrier body 21 with a configuration of the brazed regions 22 that is different from FIG. 1. The configuration is repeated after every 90° rotation around the center point. A multiplicity of other symmetrical configurations can be visualized. In FIG. 2 as well, the layered construction of the catalyst carrier body 21 formed of wavy and smooth sheet metal layers 23, 24, respectively, is also only partially and diagrammatically illustrated.

Figure 3:
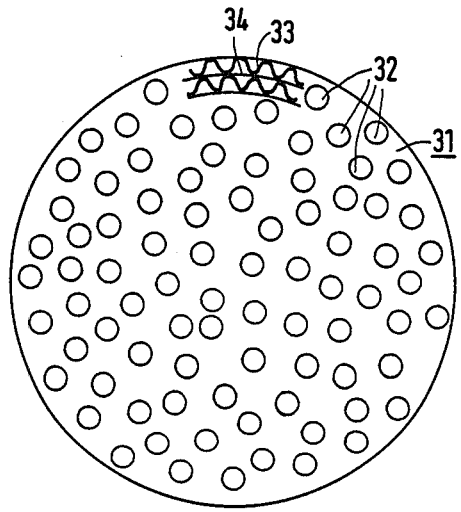

FIG. 3 shows an irregular distribution of the brazed regions 32 on an outer or front surface of a catalyst carrier body 31. Spirally wound sheet metal bands 33, 34 are brazed together by circular regions, for instance, which are distributed more or less at random over the front surface. Again, the size of the brazed regions 32 should be greater than the thickness of a layer and the width of a wave, in order to meet at least one contact point of the smooth and wavy sheet metal layers 33, 34.

Figure 4:
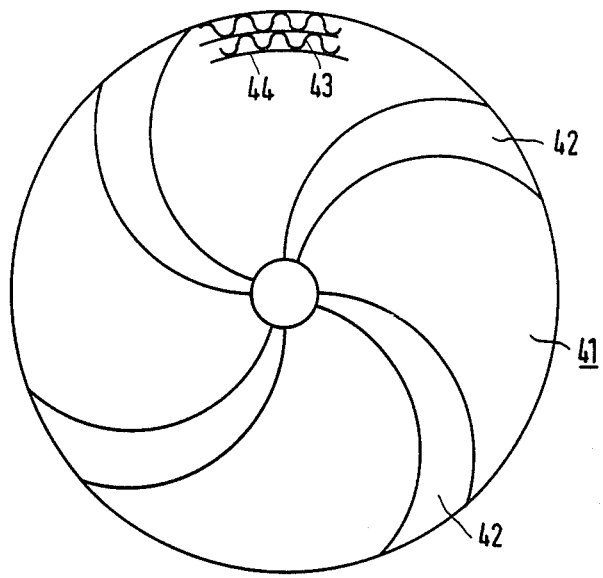
Figure 5:
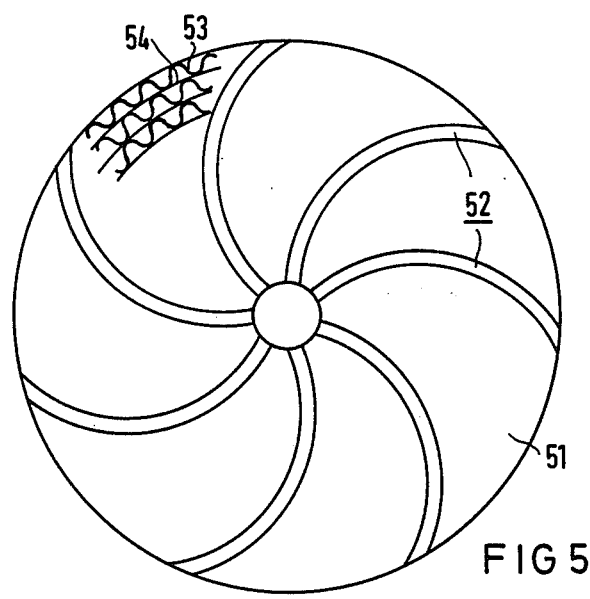

In FIGS. 4 and 5, brazed regions 42, 52 are shown which have the shape of spiral arms that originate from the center of catalyst carrier bodies 41, 51, respectively. The greater the curvature of the arms, the better the expansion capability in the radial direction. The width of the arms and their spacing can be chosen within wide limits, although very wide arms decrease elasticity.

The illustrated embodiments which are examples of the invention can be varied to a great extent and obviously can be analogously applied to front surfaces which are not circular. A combination of the different shapes of the brazed regions 12, 22, 32, 42, 52 is also possible. Furthermore, it might be necessary to completely braze the central region and perhaps the outermost region of a catalyst carrier body, so that in its strictest sense, the features according to the invention are only provided in the remaining portions.

It can be seen that each of the regions to be brazed cover less than an entire radius of the outer surfaces and less than a closed loop in circumferential direction of the outer surfaces.

I claim:

1. Catalyst carrier assembly, comprising a catalyst carrier body formed of alternately wound smooth and wavy layers of sheet metal dividing said catalyst carrier body into cells with given dimensions including a greatest dimension, said catalyst carrier body having outer surfaces, regions to be brazed covering a portion of at least one of said outer surfaces as seen in circumferential and radial directions, each of said regions to be brazed having dimensions all being greater than said greatest dimension of said cells, and brazing material disposed on said regions.

2. Catalyst carrier assembly according to claim 1, wherein said regions are continuous.

3. Catalyst carrier assembly according to claim 1, wherein said regions to be brazed have a smallest dimension being greater than said greatest dimension of said cells.

4. Catalyst carrier assembly according to claim 1, wherein said regions to be brazed form a regular pattern.

5. Catalyst carrier assembly according to claim 1, wherein said regions to be brazed form an irregular pattern.

6. Catalyst carrier assembly according to claim 1, wherein said regions to be brazed are in the form of spiral arms.

7. Catalyst carrier assembly according to claim 1, wherein said regions to be brazed are in the form of spiral arms interconnected in the middle of the at least one outer surface.

8. Catalyst carrier assembly according to claim 1, wherein said regions to be brazed are in the form of spiral arms being wider at the periphery of the at least one outer surface.

9. Catalyst carrier assembly according to claim 1, including a material from the group consisting of adhesive, contact adhesive and bonding material disposed on said regions to be brazed, below said brazing material.

10. Catalyst carrier assembly according to claim 1, wherein said regions to be brazed are wider as seen in the radial direction than as seen in the circumferential direction of said at least one outer surface.

11. Catalyst carrier assembly according to claim 1, wherein said regions to be brazed are mutually offset in at least one of the circumferential and radial directions of said at least one outer surface.

12. Catalyst carrier assembly according to claim 1, wherein said regions to be brazed cover less than half of said at least one outer surface.

13. Catalyst carrier assembly according to claim 1, wherein each of said regions to be brazed covers less than an entire radius of said outer surfaces and each of said regions to be brazed covers less than a closed loop in circumferential direction of said outer surfaces.

14. Catalyst carrier assembly, comprising a catalyst carrier body formed of alternately wound smooth and wavy layers of sheet metal dividing said catalyst carrier body into cells with given dimensions including a greatest dimension, said catalyst carrier body having outer surfaces, brazed regions covering a portion of at least one of said outer surfaces as seen in circumferential and radial directions, each of said brazed regions having dimensions all being greater than said greater dimension of said cells.

15. Catalyst carrier assembly according to claim 14, wherein said brazed regions are continuous.

16. Catalyst carrier assembly according to claim 14, wherein said brazed regions have a smallest dimension being greater than said greatest dimension of said cells.

17. Catalyst carrier assembly according to claim 14, wherein said brazed regions form a regular pattern.

18. Catalyst carrrier assembly according to claim 14, wherein said brazed regions form an irregular pattern.

19. Catalyst carrier assembly according to claim 14, wherein said brazed regions are in the form of spiral arms.

20. Catalyst carrier assembly according to claim 14, wherein said brazed regions are in the form of spiral arms interconnected in the middle of the at least one outer surface.

21. Catalyst carrier assembly according to claim 14, wherein said brazed regions are in the form of spiral arms being wider at the periphery of the at least one outer surface.

22. Catalyst carrier assembly according to claim 14, wherein said brazed regions are wider as seen in the radial direction than as seen in the circumferential direction of said at least one outer surface.

23. Catalyst carrier assembly according to claim 14, wherein said brazed regions are mutually offset in at least one of the circumferential and radial directions of said at least one outer surface.

24. Catalyst carrier assembly according to claim 14, wherein said brazed regions cover less than half of said at least one outer surface.

25. Catalyst carrier assembly according to claim 14, wherein each of said brazed regions covers less than an entire radius of said outer surfaces and each of said brazed regions covers less than a closed loop in circumferential direction of said outer surfaces.

26. Catalyst carrier assembly according to claim 14, including brazing material, and a material from the group consisting of adhesive, contact adhesive and bonding material disposed on said brazed regions below said brazing material

* * * * *